United States Patent
Ono et al.

(10) Patent No.: US 11,798,745 B2
(45) Date of Patent: Oct. 24, 2023

(54) MULTILAYER CERAMIC ELECTRONIC DEVICE AND METHOD FOR MANUFACUTING SAME

(71) Applicant: TAIYO YUDEN CO., LTD., Tokyo (JP)

(72) Inventors: Ryo Ono, Tokyo (JP); Tetsuhiko Fukuoka, Tokyo (JP); Shoji Kusumoto, Tokyo (JP); Akihiko Kono, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/928,425

(22) Filed: Jul. 14, 2020

(65) Prior Publication Data
US 2021/0020379 A1    Jan. 21, 2021

(30) Foreign Application Priority Data

Jul. 16, 2019 (JP) .................................. 2019-130956
Apr. 23, 2020 (JP) .................................. 2020-076431

(51) Int. Cl.
*H01G 4/30* (2006.01)
*H01G 4/12* (2006.01)
*H01G 4/248* (2006.01)

(52) U.S. Cl.
CPC ................. *H01G 4/30* (2013.01); *H01G 4/12* (2013.01); *H01G 4/248* (2013.01)

(58) Field of Classification Search
CPC ............ H01G 4/30; H01G 4/005; H01G 4/12; H01G 4/248
USPC .................. 361/321.2, 301.4, 303, 321.1
See application file for complete search history.

(56) References Cited

U.S. PATENT DOCUMENTS

| | | | | |
|---|---|---|---|---|
| 7,298,603 | B2 * | 11/2007 | Mizuno | H01G 4/30 |
| | | | | 361/303 |
| 8,335,072 | B1 * | 12/2012 | Kim | H01G 4/30 |
| | | | | 361/311 |
| 9,042,081 | B2 * | 5/2015 | Kim | H01G 4/012 |
| | | | | 361/321.2 |
| 9,984,826 | B2 * | 5/2018 | Morito | H01G 4/232 |
| 2012/0234462 | A1 | 9/2012 | Matsui et al. | |
| 2012/0306325 | A1 * | 12/2012 | Kim | H01G 4/005 |
| | | | | 336/200 |

(Continued)

FOREIGN PATENT DOCUMENTS

JP 2012-209539 A 10/2012

*Primary Examiner* — Arun Ramaswamy
(74) *Attorney, Agent, or Firm* — CHEN YOSHIMURA LLP

(57) ABSTRACT

A multilayer ceramic electronic device includes a ceramic functional part having a generally rectangular shape in which a plurality of ceramic dielectric layers and a plurality of internal electrodes are laminated alternately in a vertical direction; a pair of cover parts that cover the functional part from top and bottom, respectively; and a pair of side margin parts covering side surfaces of the functional part, respectively, wherein an end portion of an uppermost internal electrode among the plurality of internal electrodes is curved downward to satisfy $a \geq 1$ μm and $0.1 \leq a/b \leq 0.4$, where a is a dimension of the curved end portion in the vertical direction in a cross section taken along a plane perpendicular to the side surfaces, and b is a dimension of the curved end portion in a horizontal direction in said cross section.

8 Claims, 11 Drawing Sheets

(56) References Cited

U.S. PATENT DOCUMENTS

| 2013/0235508 | A1* | 9/2013 | Kim | .......................... | H01G 4/30 |
| | | | | | 361/301.4 |
| 2017/0243695 | A1* | 8/2017 | Kim | ....................... | H01G 4/012 |
| 2017/0250028 | A1* | 8/2017 | Makino | .................. | H01G 4/005 |

* cited by examiner

MULTILAYER CERAMIC ELECTRONIC DEVICE AND METHOD FOR MANUFACUTING SAME

BACKGROUND OF THE INVENTION

Technical Field

The present disclosure relates to a multilayer ceramic electronic device, such as a multilayer ceramic capacitor, and its manufacturing method.

Background Art

In recent years, as the miniaturization and high functionalities of electronic devices advance, there is an increasing demand for a further miniaturization and increased capacitances of multilayer ceramic capacitors, which are used in electronic devices. To meet this demand, it is effective to enlarge the internal electrodes of the multilayer ceramic capacitors. To enlarge the internal electrodes, side margin parts that protect and insulate the periphery of the internal electrodes need to be made thinner.

Patent Document 1 discloses a technique in which side margin parts are formed at a late stage during the manufacture in view of making the side margin parts thinner. In that technology, ceramic protective layers (side margin parts) are formed on side surfaces of a green chip on which lateral ends of internal electrodes are exposed.

RELATED ART DOCUMENT

Patent Document

Patent Document 1: Japanese Patent Application Laid-Open Publication No. 2012-209539

However, in the technique disclosed in Patent Document 1, because the side margin parts are made thinner, a sufficient durability against moisture was not obtained, thereby making it difficult to improve the reliability of the devices.

The present invention is devised in view of the foregoing, and aims to improve a highly reliable ceramic electronic device and its manufacturing method.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multilayer ceramic electronic device, comprising: a ceramic functional part having a generally rectangular shape in which a plurality of ceramic dielectric layers and a plurality of internal electrodes are laminated alternately in a vertical direction; a pair of cover parts that cover the functional part from top and bottom, respectively; and a pair of side margin parts covering side surfaces of the functional part, respectively, wherein in a plan view, an uppermost internal electrode among the plurality of internal electrodes spans an entire width of the functional part, and has an end portion reaching and terminating at one of the side surfaces of the functional par that are covered by the side margin parts, the end portion being curved downward to satisfy a≥1 µm and 0.1≤a/b≤0.4, where a is a dimension of the curved end portion in the vertical direction in a cross section taken along a plane perpendicular to the side surfaces, and b is a dimension of the curved end portion in a horizontal direction in said cross section.

Because the above-mentioned curved end portion satisfies a≥1 µm and 0.1≤a/b≤0.4, a sufficient distance can be secured between a surface of the multilayer ceramic capacitor and the edges of the outermost internal electrode, thereby preventing the moisture resistance from degrading. The condition of a/b≤0.4 also ensures that the outermost internal electrode are not curved excessively. With this structure, short circuits between the adjacent internal electrodes can be prevented. Accordingly, with the above-mentioned structure, the multilayer ceramic electronic device has a high reliability without moisture resistance degradation and short-circuit defects.

In the above-described multilayer ceramic electronic device, a thickness of the side margin parts may equal to or greater than 10 µm and less than or equal to 15 µm. Further, the thickness of the side margin parts may be equal to or less than 12 µm. With the above-mentioned structure, high reliability, sufficient moisture resistance, and short-circuit prevention can be achieved even with these thin side margin parts. Thus, further miniaturized, large capacitance, and highly reliable multilayer ceramic electronic devices can be obtained.

In the above-described multilayer ceramic electronic device, in the plan view, an lowermost internal electrode among the plurality of internal electrodes may span the entire width of the functional part, and may have an end portion reaching and terminating at one of the side surfaces of the functional part that are covered by the side margin parts, the end portion of the lowermost internal electrode being curved upward to satisfy a'≥1 µm and 0.1≤a'/b'≤0.4, where a' is a dimension of the curved end portion of the lowermost internal electrode in the vertical direction in the cross section taken along the plane perpendicular to the side surfaces, and b' is a dimension of the curved end portion of the lowermost internal electrode in the horizontal direction in said cross section.

Furthermore, the uppermost electrode may have the curved end portion on both sides of the uppermost electrodes, and the lowermost electrode may have the curved end portion on both sides of the lowermost electrodes.

In another aspect, the present disclosure provides a method for manufacturing a plurality of multilayer ceramic electronic devices, comprising: forming laminated sheets by laminating, alternately in a vertical direction, a plurality of first ceramic sheets, each having a plurality of internal electrode formed thereon, and a plurality of second ceramic sheets, each having a plurality of internal electrode formed thereon, and by laminating a plurality of third ceramic sheets on a top and a bottom of the laminated first and second ceramic sheets; pressure-joining the laminated sheets in the vertical direction by sandwiching the laminated sheets by a pair of elastic sheets having a plurality of protrusions at fixed intervals from top and bottom so as to push and deform inwardly regions in the first and second ceramic sheets that do not have the internal electrodes; cutting the pressure-joined laminated sheets into a plurality of laminated chips, the cutting including removing the said regions in the first and second ceramic sheets that have been pushed and deformed inwardly, thereby forming cut side surfaces in each of the laminated chips, each of the laminated chips thereby having a plurality of the internal electrodes superimposed in the vertical direction; for each of the laminated chips, attaching side margin parts to said cut side surfaces; and thereafter, sintering the laminated chips with the side margin parts, wherein in each of the sintered laminated chips with the side margin parts, in a plan view, an uppermost internal electrode among the plurality of internal electrodes spans an entire width of the laminated chip, and has an end portion reaching and terminating at one of the cut side surfaces of the laminated chip that are covered by the side margin parts, the end portion being curved downward to satisfy $a \geq 1$ μm and $0.1 \leq a/b \leq 0.4$, where a is a dimension of the curved end portion in the vertical direction in a cross section taken along a plane perpendicular to the cut side surfaces, and b is a dimension of the curved end portion in a horizontal direction in said cross section.

In the above-described method, in each of the sintered laminated chips with the side margin parts, in a plan view, a lowermost internal electrode among the plurality of internal electrodes may span the entire width of the laminated chip, and may have an end portion reaching and terminating at one of the cut side surfaces of the laminated chip that are covered by the side margin parts, the end portion being curved upward to satisfy $a' \geq 1$ μm and $0.1 \leq a'/b' \leq 0.4$, where a' is a dimension of the curved end portion of the lowermost internal electrode in the vertical direction in the cross section taken along the plane perpendicular to the cut side surfaces, and b is a dimension of the curved end portion of the lowermost internal electrode in the horizontal direction in said cross section.

According to these aspects of the present invention, a highly reliable ceramic electronic device and its manufacturing method are provided.

It is to be understood that both the foregoing general description and the following detailed description are exemplary and explanatory, and are intended to provide further explanation of the invention as claimed.

DETAILED DESCRIPTION OF EMBODIMENTS

Embodiments of the present invention will be described with reference to drawings. The drawings show the X-, Y, and Z-axes, which are common to all the drawings.

1. Configuration of Multilayer Ceramic Capacitor 10

Figure 1:
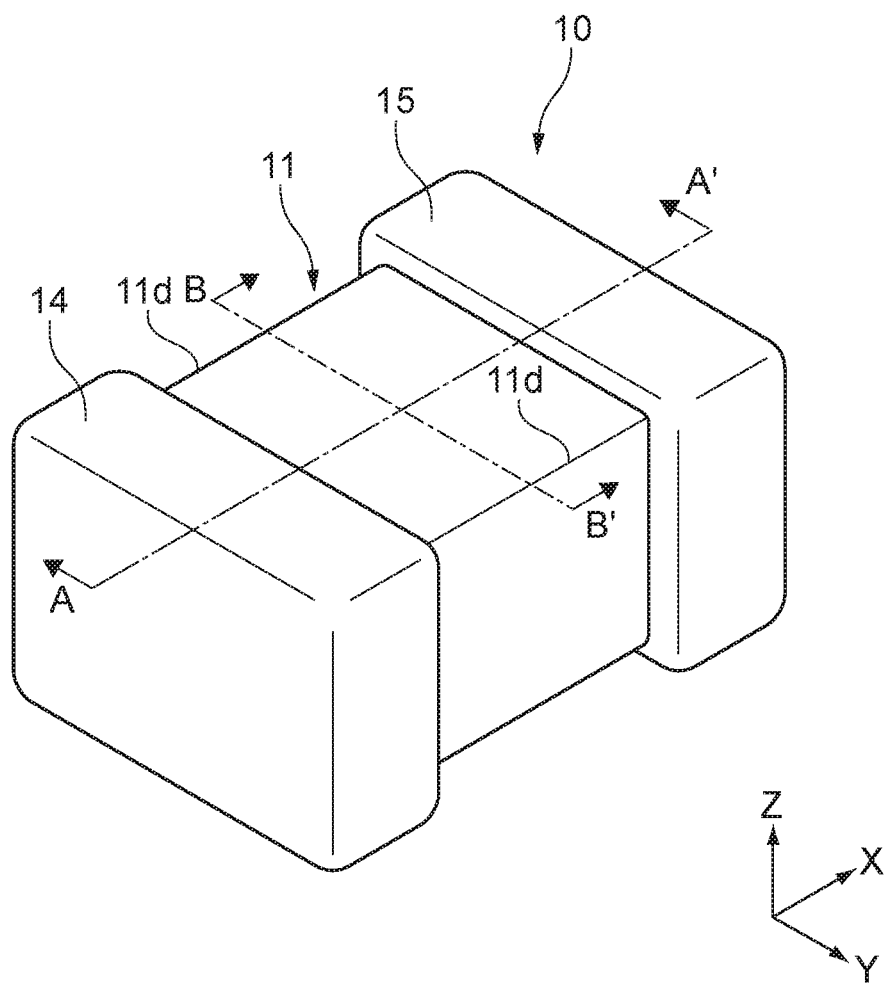
FIG. 1 is a perspective view of a multilayer ceramic capacitor according to an embodiment of the present disclosure.
Figure 2:
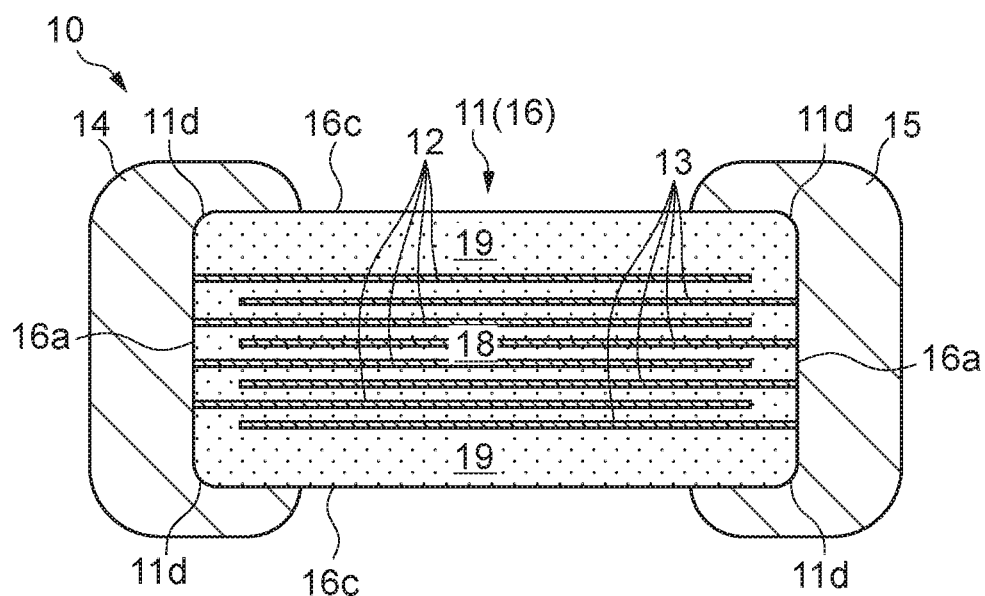
FIG. 2 is a cross-sectional view taken along the line A-A' of FIG. 1 of the multilayer ceramic capacitor of the above-described embodiment.
Figure 3:
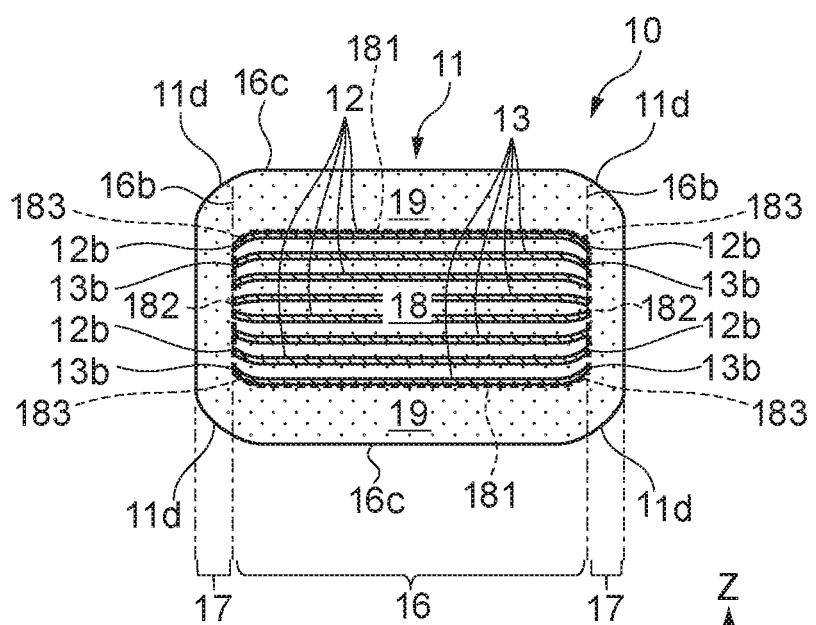
FIG. 3 is a cross-sectional view taken along the line B-B' of FIG. 1 of the multilayer ceramic capacitor of the above-described embodiment.

FIGS. 1-3 show a multilayer ceramic capacitor 10 according to an embedment of the present invention. FIG. 1 is a perspective view of the multilayer ceramic capacitor 10. FIG. 2 is a cross-sectional view taken along the line A-A' of FIG. 1 of the multilayer ceramic capacitor 10. FIG. 3 is a cross-sectional view taken along the line B-B' of FIG. 1 of the multilayer ceramic capacitor.

The multilayer ceramic capacitor 10 includes a ceramic main body 11, a first external electrode 14, and a second external electrode 15. The ceramic main body typically has two main surfaces facing the Z-direction and a direction opposite to it, respectively, two end surfaces facing the X-direction and a direction opposite to it, respectively, and two side surfaces facing the Y-direction and a direction opposite to it, respectively. Ridges 11d, which connect respective surfaces of the ceramic main body 11, are rounded, for example.

The dimension along the X-axis (length), the dimension along the Y-axis (width), and the dimension along the Z-axis (height) of the multilayer ceramic capacitor 10 are, for example: 0.25 mm (length), 0.125 mm (width), and 0.125 mm (height); 0.4 mm (length), 0.2 mm (width), and 0.2 mm (height); 0.6 mm (length), 0.3 mm (width), and 0.3 mm (height); 1.0 mm (length), 0.5 mm (width), and 0.5 mm (height), or 1.6 mm (length), 0.8 mm (width), and 0.8 mm (height). The dimension along the X-axis of the multilayer ceramic capacitor 10 is the dimension of the largest part along the X-axis, the dimension along the Y-axis of the multilayer ceramic capacitor 10 is the dimension of the largest part along the Y-axis, and the dimension along the Z-axis of the multilayer ceramic capacitor 10 is the dimension of the largest apart along the Z-axis. The dimensions mentioned above may include tolerances up to plus and minus 10%.

The external electrodes 14 and 15 respectively cover the end surfaces of the ceramic main body 11 and are opposing to each other with the ceramic main body in between along the X-axis. Each of the external electrodes 14 and 15 extends from the corresponding end surface to the adjacent main surfaces and side surfaces. This way, in each of the external electrodes 14 and 15, cross sections taken in parallel to the X-Z plane and cross sections taken in parallel to the X-Y plane are both U shaped. The shapes of the external electrodes 14 and 15 are not limited to that disclosed in FIG. 1, however.

The external electrodes 14 and 15 are made of a good electrically conductive material. Such a material may be a metal material having copper (Cu), nickel (Ni), tin (Sn), palladium (Pd), platinum (Pt), silver (Ag), or gold (Au) as its main component, or an alloy of these materials.

The ceramic main body 11 includes a laminated body 16 and side margin parts 17. The laminated body 16 has a pair of end surfaces 16a opposite to each other along the X-axis, a pair of side surfaces 16b opposite to each other along the Y-axis, and a pair of main surfaces 16c opposite to each other along the Z-axis.

A pair of side margin parts 17 cover the pair of side surfaces 16b, respectively, covering the capacitance formation part 18 from both sides along the Y-axis. The thickness of each side margin part 17 along the Y-axis can be set to, for example, 15 μm or less, more preferably, 12 μm or less. Because of this, the multilayer ceramic capacitor 10 can be miniaturized and the capacitance thereof can be increased. The thickness of each side margin part 17 along the Y-axis is preferably 10 μm or greater in order to ensure a sufficient moisture resistance in the multilayer ceramic capacitor 10. Here, the thickness of each side margin part 17 along the Y-axis is the dimension of the largest part along the Y-axis from the side surface of the ceramic main body 11 in the Y-direction to the side surface 16b of the laminated body 16.

The laminated body 16 includes a capacitance formation part 18 and a pair of cover parts 19 covering the capacitance formation part 18 from top and below (in the positive Z-direction and in the negative Z-direction), respectively. The capacitance formation part 18 includes a plurality of first internal electrodes 12 and a plurality of second internal electrodes 13 that are laminated in the Z-direction with ceramic layers interposed therebetween. The capacitance formation part 18 is a functional part of this embodiment.

Each of the internal electrodes 12 and 13 is formed of a sheet shape that extends in the X-Y plane. Each of the first internal electrodes 12 extends to one of the end surfaces 16a in the negative X-direction and is connected to the external electrode 14. Each of the second internal electrodes 13 extends to the other of the end surfaces 16a in the positive X-direction and is connected to the external electrode 15. With this structure, when voltage is applied between the first external electrode 14 and the second external electrode 15, the voltage is applied to the ceramic layers between the first internal electrodes and the second internal electrodes, thereby storing electric charges corresponding the applied voltage in the capacitance formation part 18.

The internal electrodes are made of a good electrically conductive material. Such a material may be typically nickel (Ni), but other than nickel, it may be a metal material having copper (Cu), palladium (Pd), platinum (Pt), silver (Ag), or gold (Au) as its main component, or an alloy of these materials.

In the ceramic main body 11, in order to enlarge the capacitance of each ceramic layer between the internal electrodes 12 and 13, a ceramic dielectric having a high permittivity is used. Such a ceramic dielectric having a high permittivity may be a perovskite material that includes barium (Ba) and titanium (Ti), exemplified by barium titanate ($BaTiO_3$).

Here, the ceramic layer may be made of the strontium titanate ($SrTiO_3$) system; the calcium titanate ($CaTiO_3$) system; the magnesium titanate ($MgTiO_3$) system; the calcium zirconate ($CaZrO_3$) system; the calcium titanate zirconate ($Ca(Zr, Ti)O_3$) system; the barium zirconate ($BaZrO_3$) system; and the titanium dioxide ($TiO_2$) system instead.

The cover parts 19 and the side margin parts 17 are made of an insulating ceramic. For example, the ceramic dielectric used in forming the capacitance formation part 18 may be used for the cover parts 19 and the side margin parts 17. With such a configuration, internal stress that would be otherwise generated between the capacitance formation part 18 and the cover parts 19 and the side margin parts 17 can be suppressed.

The internal electrodes 12 and 13 are formed to span the entire width along the Y-axis of the capacitance formation part 18 so that the edges of the lateral end portions 12b and 13b reach and are positioned at the respective side surfaces 16b of the laminated body 16. In this embodiment, the respective lateral end portions 12b and 13b of the internal electrodes 12 and 13 are curved inwardly along the Z-axis. The farther the internal electrodes are situated from a Z-axis center of the laminated body 16, the more their end portions are curved inwardly along the Z-axis. The details of the curved end portions will be explained below. The multilayer ceramic capacitor 10 having the curved end portions 12b and 13b in the internal electrodes 12 and 13 are manufactured by the following method, for example.

2. Manufacturing Method of the Multilayer Ceramic Capacitor 10

Figure 4:
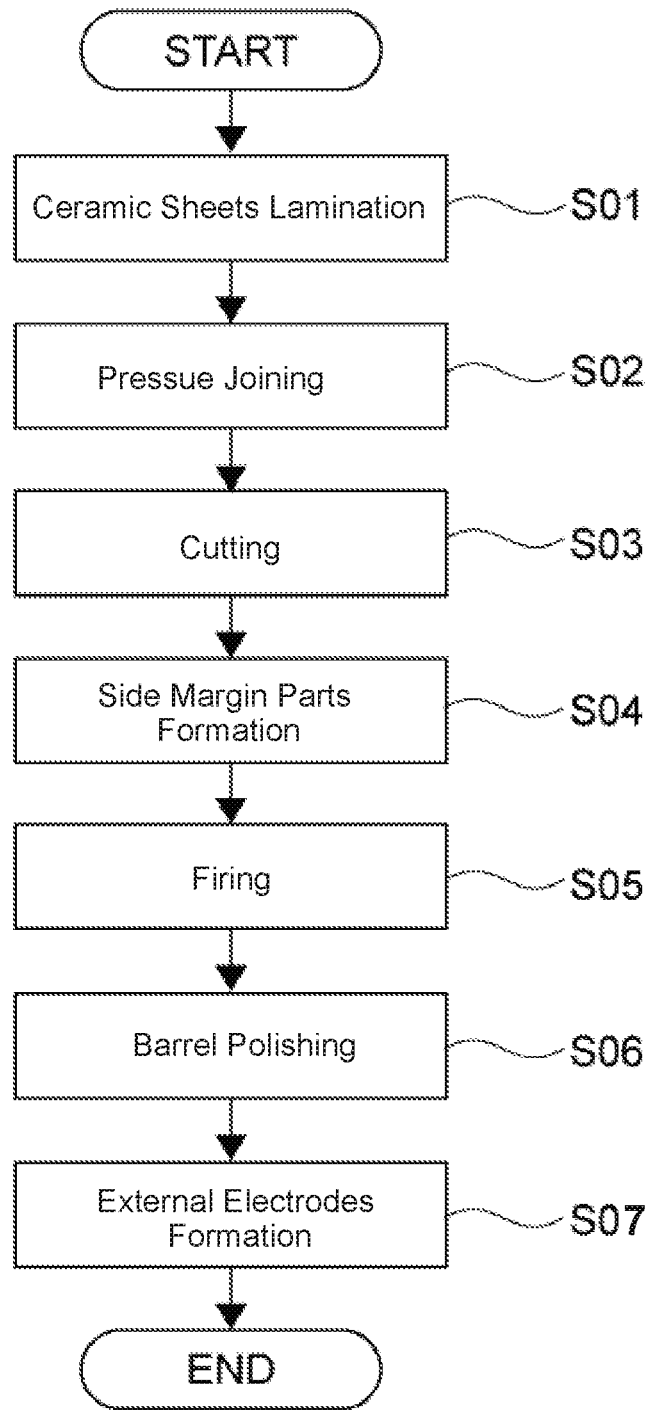
FIG. 4 is a flow chart showing a manufacturing method of the multilayer ceramic capacitor of the above-described embodiment.

FIG. 4 is a flowchart showing a manufacturing method of the multilayer ceramic capacitor 10. FIGS. 5A to 9 and 12 are drawings schematically showing the manufacturing method of the multilayer ceramic capacitor 10. The manufacturing method of the multilayer ceramic capacitor 10 will be described alongside FIG. 4 with reference to FIGS. 5A-9 and 12.

<2.1 Step S01: Ceramic Sheets Lamination>

At step S01, first ceramic sheets 101 and second ceramic sheets 102 for forming the capacitance formation part 18 and third ceramic sheets for forming the cover parts 19 are prepared, and are laminated.

The ceramic sheets 101, 102, and 103 are dielectric green sheets, which are yet to be fired, having ceramic dielectric as their main component. The ceramic sheets 101, 102, and 103 are formed into sheet shapes by a roll coater or doctor blade. The thickness of the ceramic sheets 101, 102, and 103 can be appropriately adjusted.

Figure 5A:
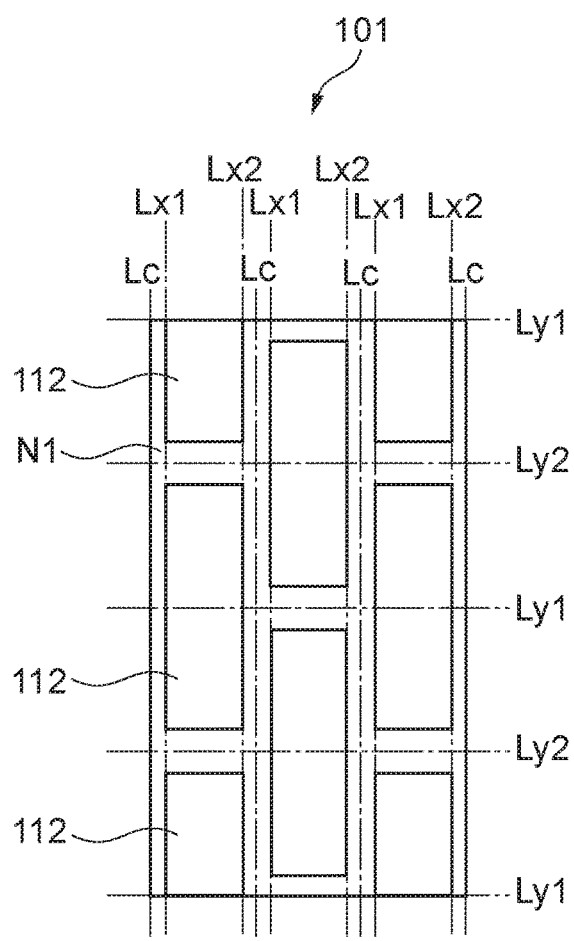
FIGS. 5A-5B are plan views in a manufacturing process of the multilayer ceramic capacitor of the above-described embodiment.
Figure 5B:
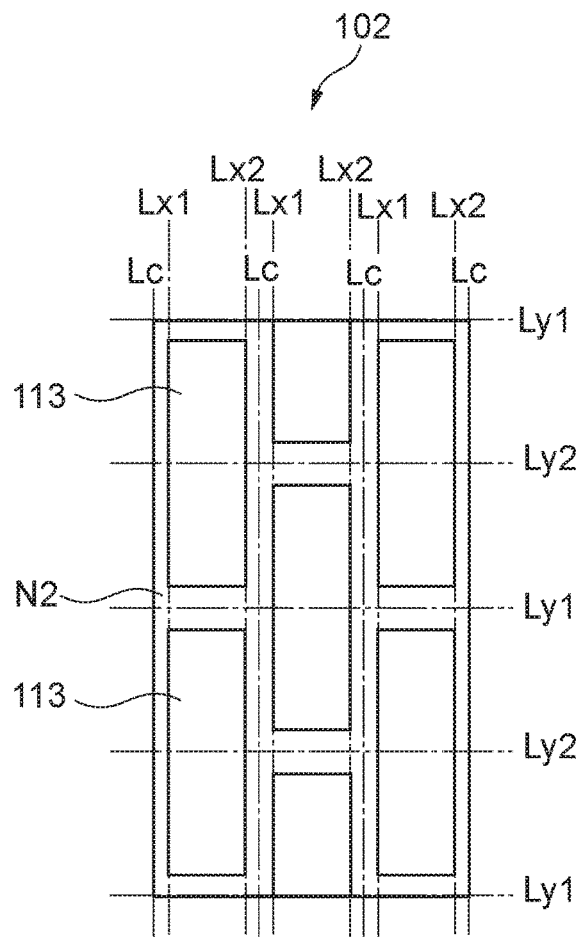

FIGS. 5A and 5B are respectively plan views of the ceramic sheets 101 and 102. At this stage, the ceramic sheets 101 and 102 have not been separated to individual sheets, and therefore, they are large mother sheets. FIGS. 5A and 5B also indicate the cutting lines Lx1, Lx2, Ly1, and Ly2 for separating these sheets into parts for the individual ceramic capacitors 10. The cutting lines Lx1 and Lx2 are parallel to the X-axis, and the cutting lines Ly1 and Ly2 are parallel to the Y-axis. Here, center lines Lc are virtual lines that divide respective spaces between the cutting lines Lx1 and Lx2 into two equal parts As shown in FIG. 5A, on the first ceramic sheet 101, first internal electrodes 112 yet to be filed, which will become the first internal electrodes 12, are formed, and on the second ceramic sheet 102, second internal electrodes 113 yet to be fired, which will become the second internal electrodes 13, are formed. Although not shown in FIGS. 5A and 5B, no internal electrode is formed on third ceramic sheets 103, which will become the cover parts 19.

The internal electrodes 112 and 113 are formed by coating an appropriate conductive paste on the ceramic sheets 101 and 102, respectively. The coating of the conductive paste can be performed by screen printing or gravure printing, for example.

In the first ceramic sheet 101, a first column in which the internal electrodes 112 that straddle the cutting lines Ly1 are arranged in the X-direction and a second column in which the internal electrodes 112 that straddle the cutting lines Ly2 are arranged in the X-direction are alternately arranged in the Y-direction. In the first column, a pair of the internal electrodes 112 that are adjacent to each other in the X-direction are opposed to each other across the cutting line Ly2. In the second column, a pair of the internal electrodes 112 that are adjacent to each other in the Y-direction are opposed to each other across the cutting line Ly1. That is, the internal electrodes 112 are arranged in the X-direction in a staggered way between the first column and the second column that are arranged in the Y-direction, thereby being shifted in position in the X-direction by a distance corresponding to a single chip. The first internal electrodes 112 are arranged in the Y-direction across the center lines Lc. The sides of the respective first internal electrodes 112 extend along the cutting lines Lx1 and Lx2.

The second internal electrodes 113 on the second ceramic sheet 102 are formed similarly. However, in the columns corresponding to the first columns of the first ceramic sheet 101, the second internal electrodes 113 straddle the cutting lines Ly2, and in the columns corresponding to the second columns of the first ceramic sheet 101, the second internal electrodes 113 straddle the cutting lines Ly1. That is, relative to the first internal electrodes 112, the second internal electrodes 113 are arranged in the X-direction and the Y-direction, shifted in position by width and length of to a single chip. The second internal electrodes 113 are arranged in the Y-direction across the center lines Lc. The sides of the respective second internal electrodes 113 extend along the cutting lines Lx1 and Lx2.

On the first ceramic sheet 101, no-electrode regions N1 on which the internal electrodes 112 are not coated are formed in a lattice pattern on the center lines Lc and on parts of the cutting lines Ly1 and Ly2. Similarly, on the first ceramic sheet 102, no-electrode regions N2 on which the internal electrodes 113 are not coated are formed in a lattice pattern on the center lines Lc and on parts of the cutting lines Ly1 and Ly2. That is, along the center lines Lc that are positioned at the center of the cutting lines Lx1 and Lx2, the non-electrode regions N1 and N2 overlap with each other.

Figure 6:
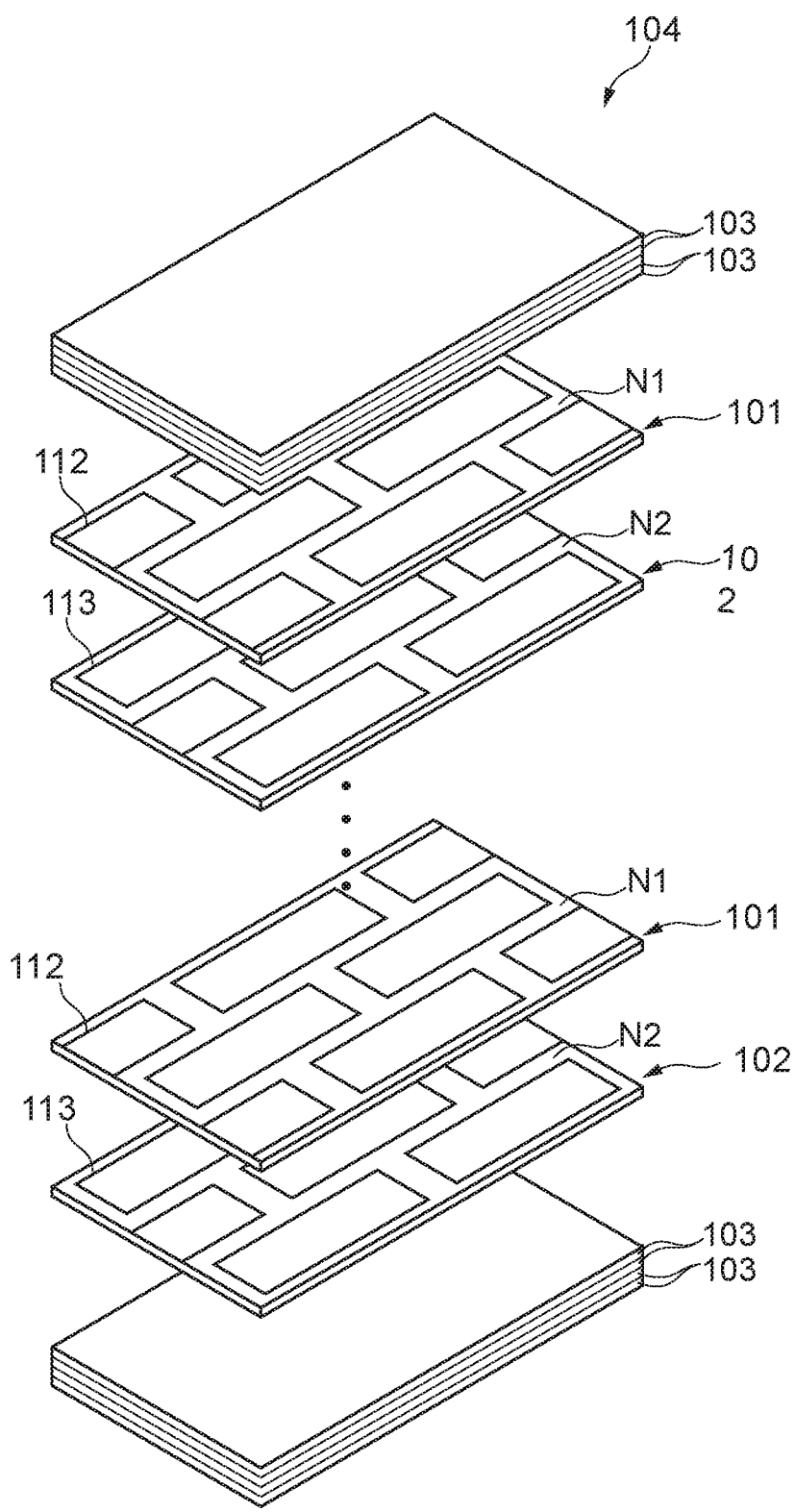
FIG. 6 is a perspective view in a manufacturing process of the multilayer ceramic capacitor of the above-described embodiment.

These ceramic sheets 101, 102, and 103 are laminated, as shown in FIG. 6, to form the laminated sheets 104. More specifically, the first ceramic sheets 101 and the second ceramic sheets 102 are alternately laminated, and on each of the top and bottom surfaces of the resultant laminate along the Z-direction, the third ceramic sheets 103 are laminated. Although four sheets of the third ceramic sheets are laminated on the top and bottom surfaces of the laminate in FIG. 6, respectively, in FIG. 6, the number of sheets of the third ceramic sheets 103 may be changed as needed.

<2.2 Step S02: Pressure Joining>

At step S02, the laminated sheets 104 are pressure-joined from the positive and negative directions along the Z-axis.

Figure 7:
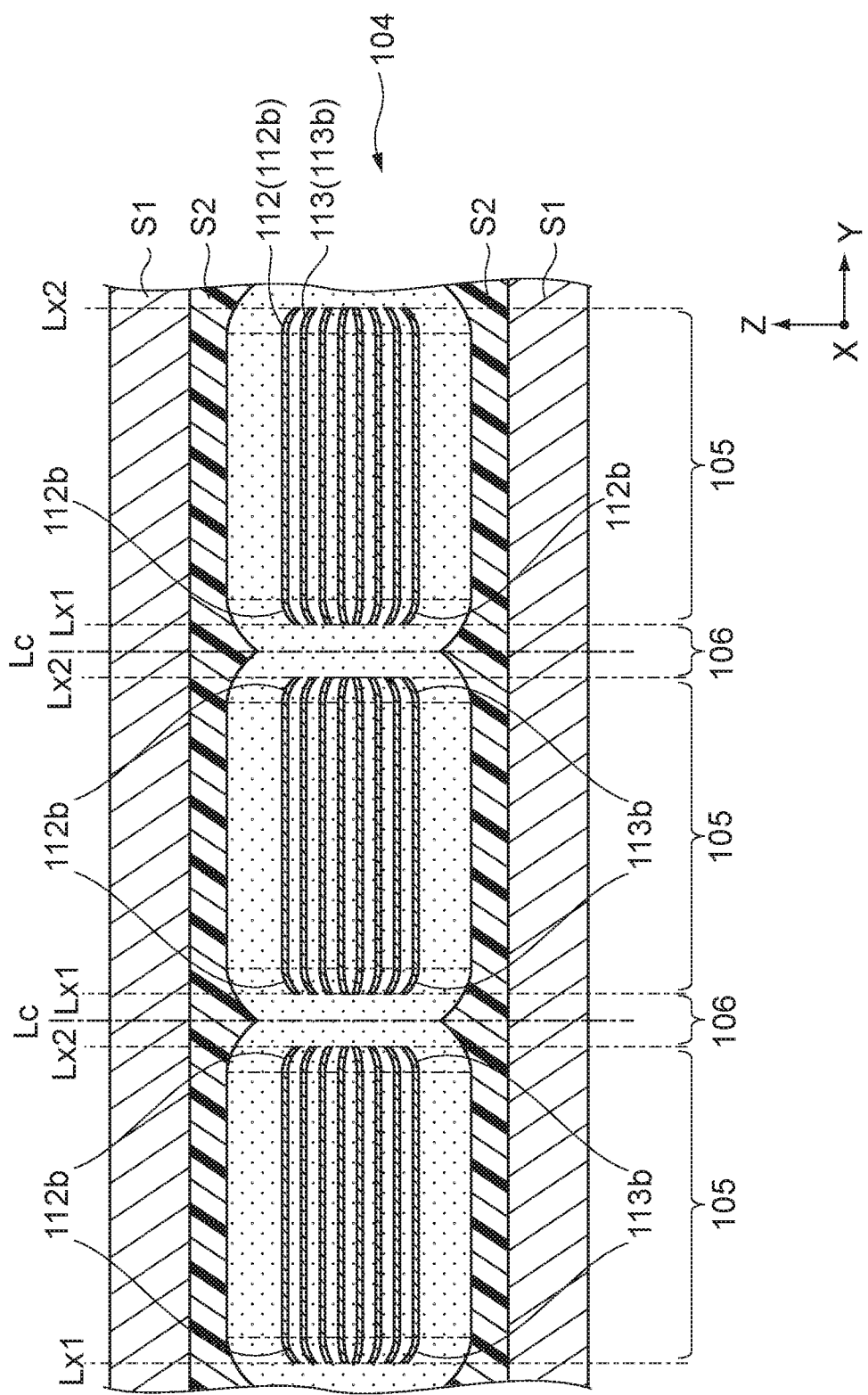
FIG. 7 is a cross-sectional view in a manufacturing process of the multilayer ceramic capacitor of the above-described embodiment.
Figure 12:
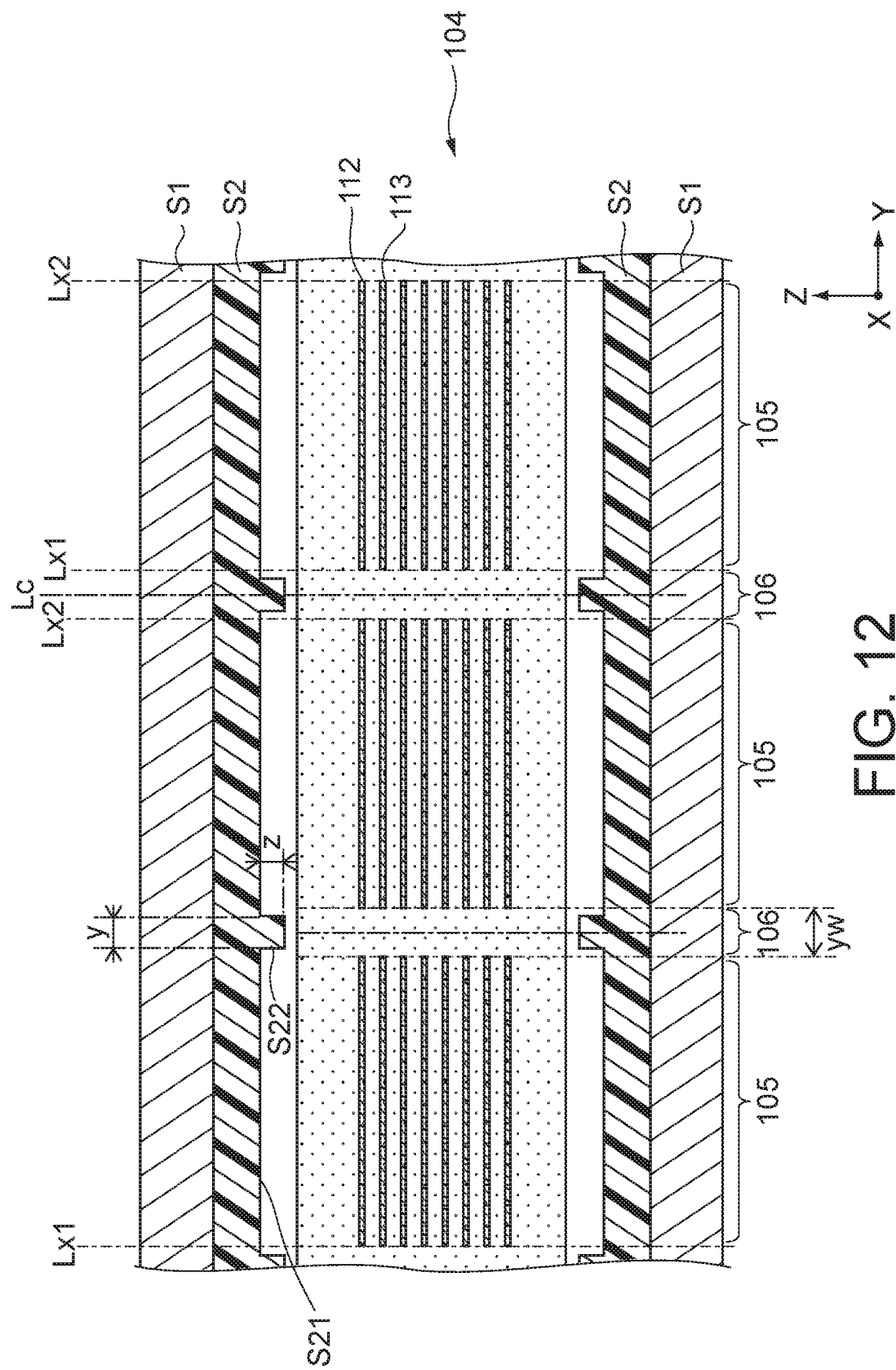
FIG. 12 is a cross-sectional view in a manufacturing process of the multilayer ceramic capacitor of the above-described embodiment.

FIGS. 7 and 12 explain the pressure-joining process of step S02. These are schematic cross-sectional views of the laminated sheets 104 as seen from the negative X-direction.

In this pressure joining step, a pair of pressure applying boards S1 are arranged to face each other so as to sandwich the laminated sheets 104, and the pressure applying boards S1 are applied with pressure towards the laminated sheets 104 so as to pressure-joint the laminated sheets 104. The pressure applying boards S1 apply pressures to the laminated sheets 104 by hydrostatic pressurization or uniaxial pressurization.

Further, between each of the pressure applying boards S1 and the laminated sheets 104, an elastic sheet S2 is disposed. The elastic sheet S2 is made of an elastic material having a sheet shape, and made of a polyethylene terephthalate (PET) resin, for example. The elastic sheets S2 are pressed towards the laminated sheets 104 via the pressure applying boards S1.

The laminated sheets 104 have capacitance formation regions (functional regions) 105 in which the internal electrodes 112 and 113 are laminated and cutting regions 106 in which the no-electrode regions N1 and N2 are laminated. The capacitance formation regions 105 corresponds to the capacitance formation parts 18 and the cover parts 19. The cutting regions 106 are regions between two adjacent capacitance formation regions 105 along the Y-axis in which the internal electrodes 112 and 113 are not laminated. That is, the cutting regions 106 are regions surrounded by the cutting lines Lx1 and Lx2, and will be cut out in the cutting step, which will be described below.

As shown in FIG. 12, the elastic sheet S2 is constituted of regions S21 that pressure-join the capacitance formation regions 105, respectively, and regions S22 that pressure-join cutting regions 106, respectively. The regions S22 are made thicker than the regions S21 in the Z-direction. The surfaces of the regions S22 facing the laminated sheets 104 protrude in the Z-direction from the surfaces of the regions S21 facing the laminated sheets 104. The cross section of the protruded portion of the region S22 taking along the Y-Z plane is formed in a generally rectangular shape. A step or the like is formed between the regions S22 and regions S21. The difference in thickness in the Z-direction between the region S22 and the region S21 is indicated by z. The regions S22 are respectively located at the center, in the Y-direction, of the cutting regions 106 so that the regions S22 of the elastic sheet S2 at the top are opposed to the regions S22 of the elastic sheet S2 at the bottom. The dimension of the region S22 in the Y-direction is indicated by y in the drawing. By pressing the laminated sheets 104 via the elastic sheets S2, the cutting regions 106 will sink in inwardly along the Z-axis, as will be explained below.

In the capacitance formation region 105, the ceramic sheets 101 and 102 on which the internal electrodes 112 and 113 are formed are laminated without any gap in between. Because of this, through the pressure-joining process, the entire capacitance formation regions 105 are stretched to the X- and Y-directions, and are compressed uniformly. As a result, the capacitance formation regions 105 have generally flattened surfaces.

On the other hand, in the cutting regions 106 before pressure application, there are spaces corresponding to the no-electrode regions N1 and N2. Also, the green sheets are more elastic and stretchable as compared with the internal electrodes 112 and 113. Because of this, the green sheets that are stretched and extended from the capacitance formation regions 105 by pressure come into these spaces.

Further, each of the elastic sheets S2 has thick regions S22 that are thicker than the regions S21, and these thick regions S22 face the regions S22 of the other elastic sheet S2 so as to apply larger loads on the thin cutting regions 106 by way of elastic deformation. Because of this, in the cutting regions 106, the green sheets that are stretched from the capacitance formation region 105 and the green sheets that are laminated before the pressure application are pressure-jointed along the Z-axis while being stretched in the X-Y plane. As a result, adjacent to the cutting regions 106, the distances between the internal electrodes 12 and 13 become progressively smaller towards the center lines Lc. That is, the thickness of the cutting regions 106 becomes progressively smaller towards the center lines Lc. Thus, as shown in FIG. 7, the cutting regions 106 are deformed such that their respective surfaces sink inwardly in the negative and positive Z-directions from the top and from the bottom, respectively.

In accordance with the sinking of the cutting regions 106, end portions 112b and 113b of the internal electrodes 112 and 113 are curved inwardly along the Z-axis. In more detail, the end portions 112b and 113b receive force in the inward directions along the Z-axis applied by the elastic sheets S2 that protrude into the cutting regions 106, and are thereby curved. The end portions 112b and 113b also receives force in the inward directions along the Z-axis from the laminated ceramic sheets 103, which have been stretched from the center area of the capacitance formation regions 105. This results in the curved end portions 112b and 113b in the internal electrodes 112 and 113. As the internal electrodes 112 and 113 are located farther from a Z-direction center plane, the force applied to them in the inward directions (negative and positive Z-directions, respectively) along the Z-axis becomes larger, and therefore, the internal electrodes 112 and 113 are curved more inwardly.

<2.3 Step S03: Cutting>

Figure 8:
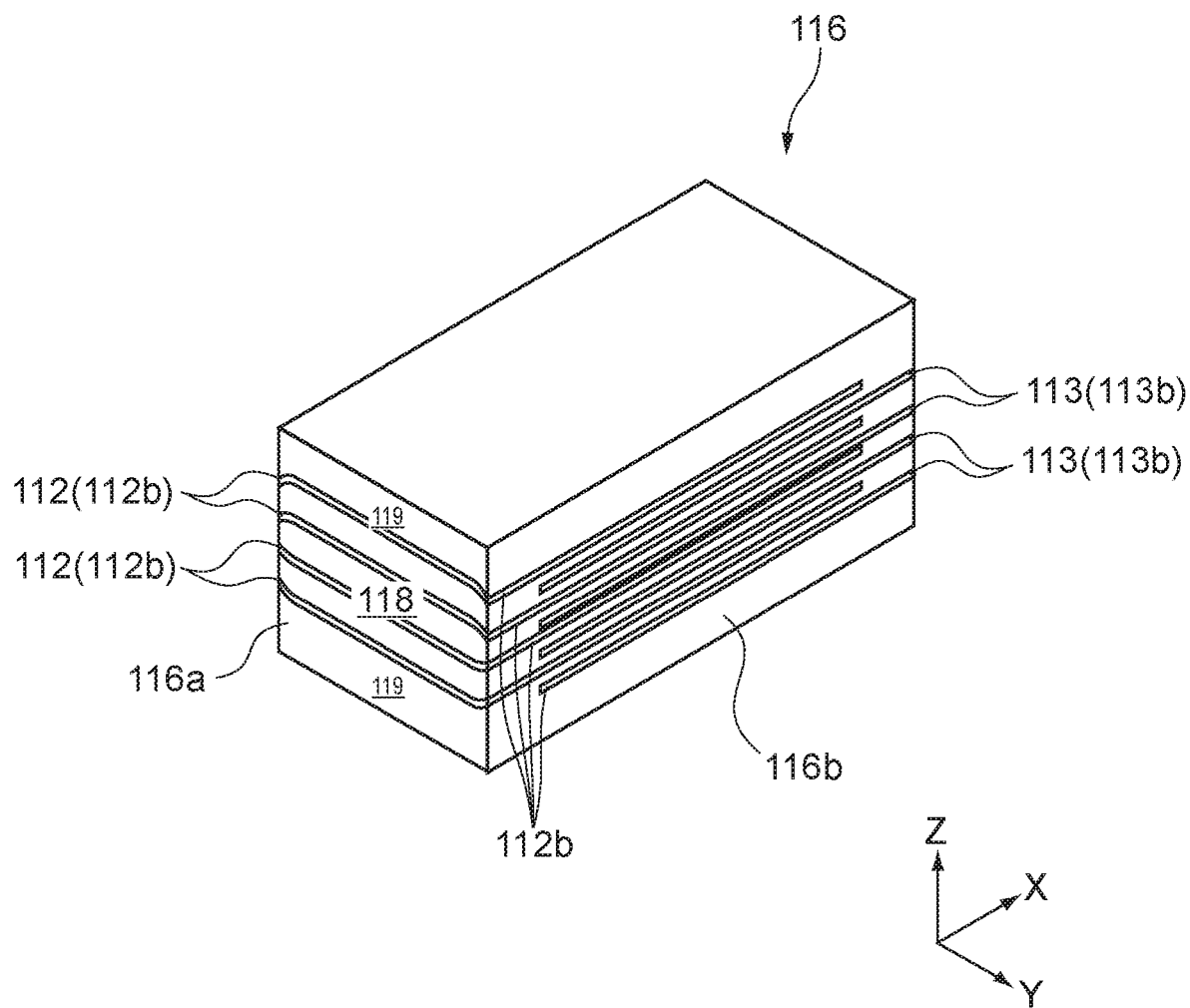
FIG. 8 is a perspective view in a manufacturing process of the multilayer ceramic capacitor of the above-described embodiment.

At step S03, by cutting the laminated sheets 104 that have been pressure-joined at step S02 along the cutting lines Lx1, Lx2, Ly1, and Ly2, a plurality of laminated chips 116, one of which is shown in FIG. 8, are manufactured. The laminated chip 116 will become the laminated body 16 after being fired. In cutting the laminated sheets 104 at this step, a push-cutting blade or rotary blade may be used.

Figure 9:
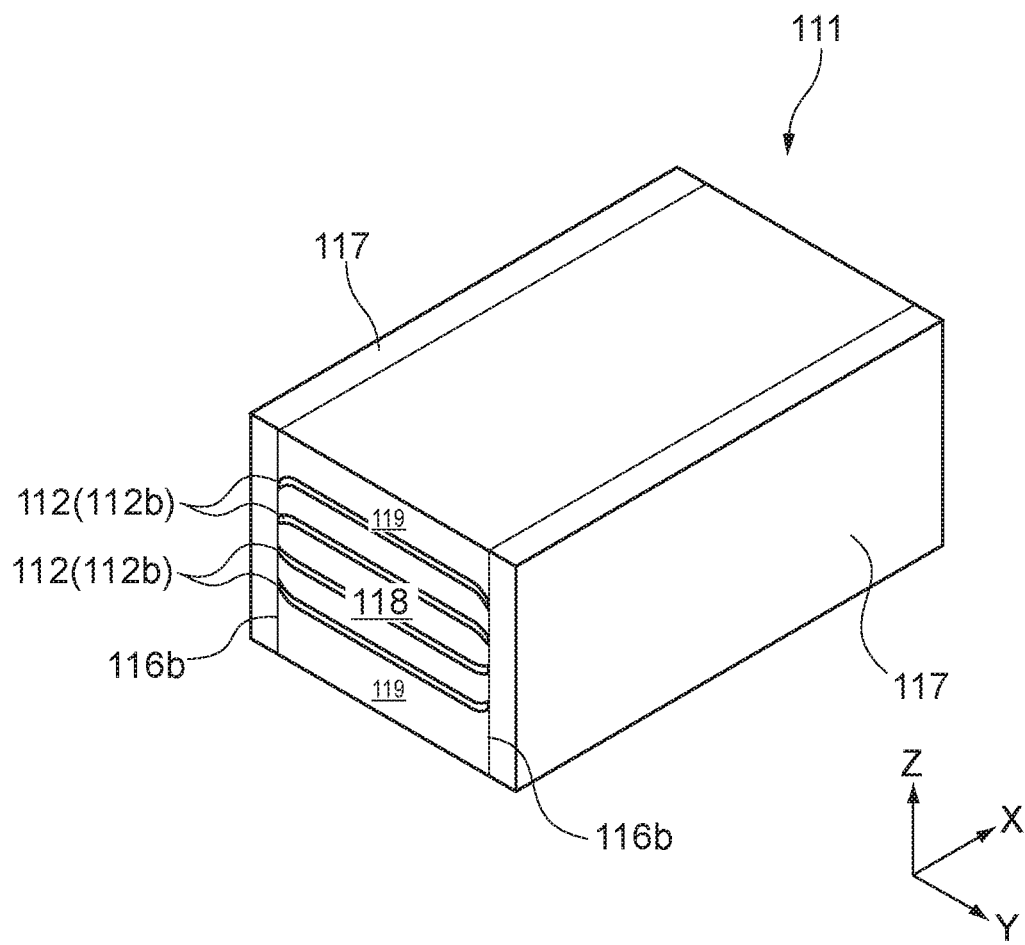
FIG. 9 is a perspective view in a manufacturing process of the multilayer ceramic capacitor of the above-described embodiment.

Here, although the top and bottom surfaces of the laminated chip 116 are depicted as entirely flat in FIGS. 8-9 for ease of illustration, in actuality, these surfaces are curved inwardly along the Z-axis at the respective end portions like the end portions 112b and 113b.

When the cutting lines Lx1 and Lx2 are cut by a push-cutting blade, because the blade is relatively thin, each of the cutting lines Lx1 and Lx2 is cut by the blade. Accordingly, the laminated Sheets 104 are cut at each of the cutting lines Lx1 and Lx2, and the cutting regions 106 between the cutting lines Lx1 and Lx2 are removed to produce a plurality of laminated chips 116.

When the cutting lines lx1 and Lx are cut by a rotary blade, because the blade is relatively thick, the blade is attached to the entire cutting regions 106 including the cutting lines Lx1 and Lx2, thereby removing the cutting region 106 at once, so as to produce a plurality of laminated chips 116.

As shown in FIG. 8, each of the thus produced laminated chips 116 has side surfaces 116b as the cut side surfaces corresponding to the cutting lines Lx1 and Lx2. The edges of the end portions 112b and 113b of the internal electrodes 112 and 113 are exposed on the side surfaces 116b. The end portions 112b and 113b are curved inwardly along the Z-direction as they approach the side surfaces 116b. Further, the laminated chip 116 has end surfaces 116a as cut side surfaces corresponding to the cutting lines Ly1 and Ly2. Each of the end surfaces 116a expose ends of one of the internal electrodes 112 and 113.

In more detail, the laminated chip 116 has the capacitance formation part 118 yet to be fired that corresponds to the capacitance formation part 18 and the cover parts 119 yet to be fired that corresponds to the cover parts 19. In the capacitance formation part 118, the internal electrodes 112 and 113 are alternately laminated between the green sheets that correspond to the ceramic layers. The capacitance formation part 118 has a rectangular shape with rounded corners, as seen from the X-direction because the end portions 112b and 113b of the internal electrodes 112 and 113 are curved.

<2.4 Step S04: Side Margin Parts Formation>

At step S04, side margin parts 115 that are yet to be fired are formed on the surfaces 116b which are exposing the edges of the internal electrodes 112 and 113. As a result, the ceramic main body 111 that is yet to be fired, as shown in FIG. 9, is completed.

The side margin parts 117 include ceramic material that is yet to be fired, and are made of ceramic sheets or ceramic slurry, specifically. The side margin parts 117 can be formed by, for example, attaching a ceramic sheet to the side surface 116b of the laminated chip 116. Alternatively, the side margin parts 117 may be formed by coating the side surface 116b of the ceramic chip 116 with a ceramic slurry by a coating or dipping method.

<2.5 Step S05: Firing>

At step S05, the ceramic main body 111 that is yet to be fired, which is obtained in step S04, is fired. The firing temperature at step S05 may be determined based on the sintering temperature of the ceramic main body 111. The firing may be performed in a reducing atmosphere or low oxygen partial pressure atmosphere.

<2.6 Step S06: Barrel Polishing>

At step S06, the fired ceramic main body 111 is barrel-polished. The barrel polishing is performed by putting a plurality of ceramic main bodies 111 in a barrel and giving rotation and vibration movements to the barrel. Polishing agents or liquid may be included in the barrel in addition to the plurality of ceramic main bodies 111. Due to this process, the ridges 11d connecting respective surfaces of the ceramic main bodies 111 are chamfered, thereby forming a plurality of ceramic main body 11, one of which is shown in FIGS. 1-3.

Here, the barrel polishing of step S06 may be performed with respect to the ceramic main body 111 that is yet to be fired. That is, the barrel polishing of step S06 may be performed before the firing step S05.

<2.7 step S07: External Electrodes Formation>

At step S07, external electrodes 14 and 15 are formed on the respective end surfaces of the ceramic main body 11 that has been obtained at step S06. The method for forming the external electrodes 14 and 15 may be selected from known methods as appropriate. As a result, the ceramic capacitor 10, as shown in FIG. 1-3, is complete.

Here, some of the treatments at step S07 may be performed before step S05. For example, before step S05, an electrode material that is yet to be fired may be coated on the end surfaces of the ceramic main body 111 that is yet to be fired, and at step S05, the ceramic main body 111 yet to be fired is fired, and the electrode material yet to be fired is baked at the same time so as to form undercoats for the external electrodes 14 and 15. Also, the ceramic main body 111 that underwent a debinding process may be coated with an electrode material yet to be fired, and the ceramic main body and the electrode material may be fired at the same time.

The multilayer ceramic capacitor 10 is made by the method described above. In the method above, the side margin parts 17 are attached to the side surfaces 16b of the laminate body 16 that is exposing the edges of the internal electrodes 12 and 13. Because of this, the Y-axis positions of the edges of the plurality of internal electrodes are aligned within 0.5 μm in the Y-direction so that these edges are aligned along the Z-direction.

The internal electrodes 12 and 13 have the curved end portions 12b and 13b corresponding to the end portions 112b and 113b. Due to these end portions 12b and 13b, the capacitance formation part 18 have the below-described cross section, as will be explained below.

3. Detailed Explanation of Capacitance Formation Part 18

In a cross section taken along the Z-Y plane that divides the capacitance formation part 18 into two equal parts (the cross section taken along the line B-B' of FIG. 1), the capacitance formation part 18 has a corner-rounded rectangular shape. This cross section is referred to as the B-B' cross section hereinafter.

As shown in FIG. 3, in the above-mentioned cross section, the capacitance formation part 18 has a pair of first straight portions 181 that are in contact with the respective cover parts 19 and that extend in the Y-direction, a pair of second straight portions 182 that are in contact with the respective side margin parts 17 and that extend in the Z-direction, and four corner portions 183 that connect the first straight portions 181 and the second straight portions 182. The pair of first straight portions 181 are opposed to each other along the Z-axis, and the pair of the second straight portions 182 are opposed to each other along the Y-axis.

In the B-B' cross section, the capacitance formation part 18 has line symmetries with respect to a center line parallel to the Y-direction and a center line parallel to the Z-direction. Therefore, the details of one of the corner portions 183 and the first and second straight portions 181 and 182 that are connected thereby will be explained with reference to FIG. 10, which is a magnified view of FIG. 3.

Figure 10:
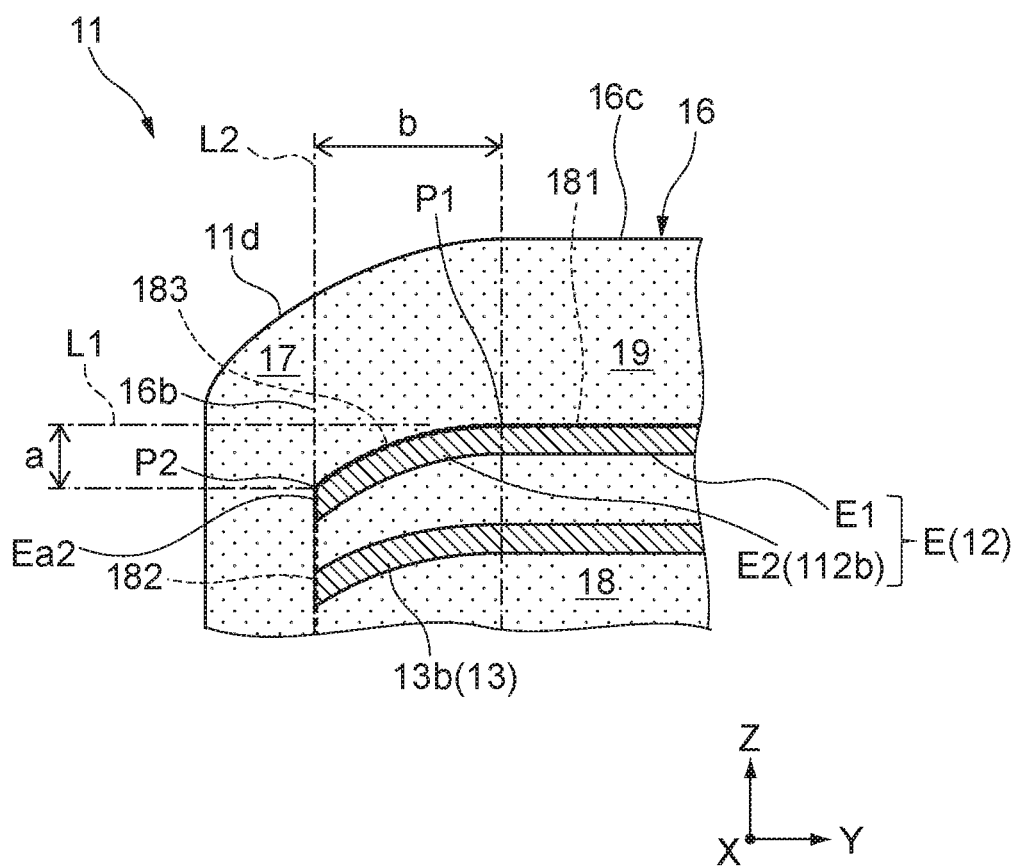
FIG. 10 is a magnified view magnifying a portion of FIG. 3 of the above-described embodiment.

As shown in FIG. 10, the first straight portions 181 is a straight-line part extending in the Y-direction, and is defined by the top (or bottom) surface of the outermost (uppermost or lowermost) internal electrode among the internal electrodes 12 and 13. Here, the first straight portions 181 may be a generally straight line, and may be slightly curved or meandering in the Z-direction within 1%, for example, of the thickness dimension (along the Z-axis) of the ceramic main body 11.

The outermost internal electrode 12 or 13 is referred as the outermost internal electrode E. The outermost internal electrode E has a flat portion E1 that constitutes the first straight portion 181, and an end portion E2 that is positioned at a periphery of the flat portion E1 at the negative Y-direction side (in the drawing) and that is curved inwardly (in the negative Z-direction in the drawing). The flat portion E1 may be generally flat, and may have small protrusions and recesses within 1%, for example, of the height dimension of the ceramic main body 11.

An end point P1 of the first straight portion 181 is defined san boundary point between the flat portion E1 and the end portion E2.

The second straight portion 182 is a straight-line part extending in the Z-direction, and is formed by the side surface 16b of the laminated body 16. The second straight portion 182 may be generally straight, and may be slightly curved or meandering within 0.5%, for example, of the width dimension (along the Y-axis) of the ceramic main body 11.

An end point P2 of the second straight portion 182 is defined as a tip of the end face Ea2 of the end portion E2 of the outermost internal electrode E.

The corner portion 183 is a curved portion that connects the end point P1 of the first straight portion 181 and the end point P2 of the second straight portion 182. The corner portion 183 is constituted of the end portion E2 of the outermost internal electrode E. The corner portion 183 is curved inwardly in the negative Z-direction from the end point P1 of the first straight portion 181 towards the end point P2 of the second straight portion 182.

The shape of the corner portion 183 is defined by the value of a and the value of a/b, where a is a value corresponding to the height dimension along the Z-axis of the corner portion 183 (i.e., the curved end portion E2), and b is a value corresponding to the lateral dimension along the Y-axis of the corner portion 183 (i.e., the curved end portion E2). A preferred shape of the corner portion 183 is defined by these values.

More specifically, a is a distance along the Z-axis between a virtual line L1 that is extended from the first straight portion 181 and the end point P2 of the second straight portion 182. The value of a can be controlled by the number of the laminated ceramic sheets 101 and 102 and the thickness of the ceramic sheets 101 and 102, etc. Moreover, the value of a may be controlled by the elastic modulus of the elastic sheet S2 and/or the load of the pressure applying boards S1 used in the pressure-joining step S02.

b is a distance along the Y-axis between a second virtual line L2 that is extended from the second straight portion 182 and the end point P1 of the first straight portion 181. The value of b can be controlled by the number of the laminated ceramic sheets 101 and 102 and the thickness of the ceramic sheets 101 and 102 as well as by the elastic modulus of the elastic sheet S2 and/or the load of the pressure applying boards S1 used in the pressure-joining step S02. Furthermore, referring to FIG. 12, by setting the dimension y of the region S22, which is a thick portion of the elastic sheet S2 facing the cutting region 106, to be large along the Y-direction, the value of b can be made large, and by setting the dimension y of the region S22 to be small, the value of b can be made small. The dimension y may be appropriately adjusted within a range of 15% or larger and 95% or less of the dimension yw, which is the width of the cutting region 106 along the Y-axis. Moreover, by setting the dimension z of the region S22, which is a thick portion of the elastic sheet S2 facing the cutting region 106, to be large along the Z-direction, the value of a can be made large, and by setting the dimension z of the region S22 to be small, the value of a can be made small. The dimension z may be appropriately adjusted within a range of 5% or more and 40% or less of the thickness along the Z-axis of the laminated sheets 104 before being pressure-joined. Further, by making the ratio z/y large, the value of a/b can be made large, and by making the ratio z/y small, the value of a/b can be made small.

The corner portion 183 is curved such that the condition, $a \geq 1$ μm and $0.1 \leq a/b \leq 0.4$, is satisfied. When the corner portion 183 satisfies $a \geq 1$ μm and $0.1 \leq a/b$, the end portion E2 of the outermost internal electrode E can be curved sufficiently, thereby improving the moisture resistance, as will be explained below.

Figure 11A:
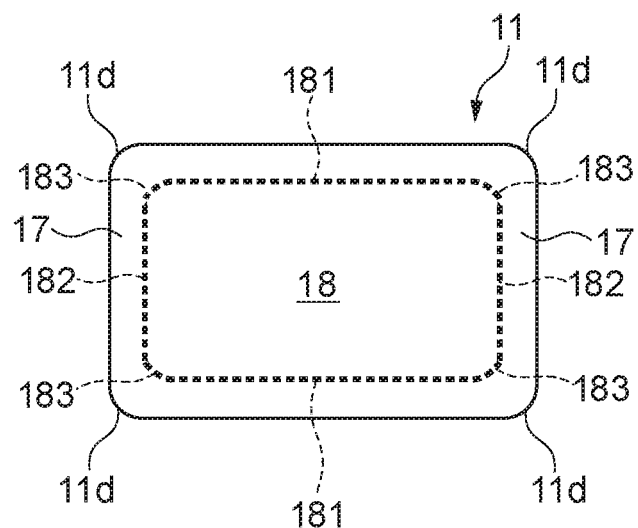
FIG. 11A is a schematic cross-sectional view taken along the line B-B' of the multilayer ceramic capacitor of the above-described embodiment.
Figure 11B:
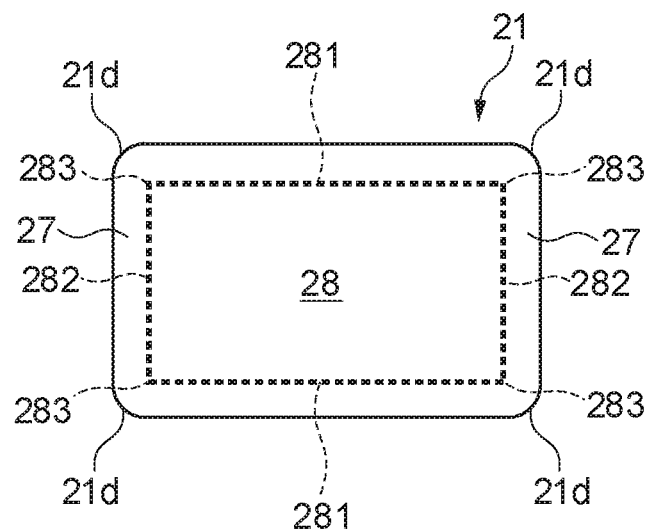
FIG. 11B is a schematic cross-sectional view, similar to FIG. 11A, of a comparison example to be compared with the multilayer ceramic capacitor of the above-described embodiment.
Figure 11B:
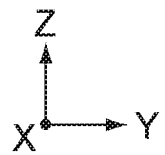

FIG. 11A schematically shows the B-B' cross section of the ceramic main body 11 according to the present embodiment, in which an area occupied by the capacitance formation part 18 is surrounded by dotted lines. FIG. 11B schematically shows the corresponding B-B' cross section of a ceramic main body 21 of a comparison example, in which an area occupied by the capacitance formation part 28 is surrounded by dotted lines.

In the ceramic main bodies 11 and 21, the ridges 11*d* and 21*d* are typically chamfered for the purpose of chipping prevention. Therefore, the ridges 11*d* and 21*d* of the ceramic main bodies 11 and 21 are rounded.

In the ceramic main body 21 of the comparison example of FIG. 11B, the end portions of the internal electrodes in the capacitance formation part 28 along the Y-axis are not curved, and therefore, the cross section of the capacitance formation part 28 has a rectangular shape. That is, the capacitance formation part 28 has the first straight portions 281 extending straight in the Y-direction, the second straight portions 282 extending straight in the Z-direction, and the corner portions 283 that are mostly right-angled.

Because of this, the distance from the rounded ridge 21*d* to the corner portion 283 that is formed by the end portion of the outermost internal electrodes tends to become small. This means that when the side margin parts 27 are thin along the Y-axis, the distance between the ridge 21*d* and the outermost internal electrode is small. Then, water can readily permeate from the ridges 21*d*, lowering the moisture resistance.

In contrast, in the ceramic main body 11 of FIG. 11A, the capacitance formation part 18 has corner portions 183 that are curved such that a≥1 μm and 0.1≤a/b. Because of this, the distance from the ridges 11*d* of the ceramic main body 11 to the end portion E2 of the outermost internal electrode E can be sufficiently provided, thereby preventing a reduction in the moisture resistance due to the thin side margin parts 17.

Referring to FIG. 10, it can be seen that with the corner portion 183 satisfying a≥1 μm, the distance from the main surface 16*c* to the end face Ea2 of the outermost internal electrode E can be sufficiently secured. Because the side margin parts 17 are formed at a late stage of the manufacture in the present embodiment, the interface between the laminated body 16 and the side margin part 17 tend to become a path for moisture to enter. In this embodiment, the distance along the Z-axis from the main surface 16*c* to the end face Ea2 can be made large by providing sufficient value of a. Therefore, with the corner portion 183 satisfying a≥1 μm, this distance can be sufficiently provided, thereby enhancing the moisture resistance against water entrance from the surface 16*c* side.

Further, with the corner portion 183 satisfying a/b≤0.4, the end portion E2 of the outermost internal electrode E is not curved in the negative Z-direction excessively. As described above, the internal electrodes 12 and 13 that are positioned father away outwardly along the Z-axis have more curved end portions 12*b* and 13*b*—i.e., curved more inwardly along the Z-axis. When the outermost internal electrode E is curved excessively, the end portion E2 and the adjacent end portion 12*b* or 13*b* may contact each other, causing a short circuit. By the corner portion 183 satisfying a/b≤0.4, the end portion E2 is not curved excessively, preventing occurrence of short circuits between the internal electrodes 12 and 13.

In view of the forgoing, according to the multilayer ceramic capacitor 10 of the present embodiment, the moisture resistance is improved and short circuits between the internal electrodes 12 and 13 are prevented, thereby providing a high reliability.

Working examples of the present invention are described below.

4. Working Examples

Various working examples and comparison examples of the multilayer ceramic capacitors having capacitance formation regions of various cross-sectional shapes were manufactured and their reliabilities were investigated. The dimensions in the X-direction of these samples were 1.0 mm, and the dimensions in the Y-direction and in the Z-direction of these samples were 0.5 mm, respectively.

Table 1 lists measured values of a and b for the corner portions of the capacitance formation parts for the various Working Examples and Comparison Examples. Here, the values listed in Table 1 are each averaged values that were averaged over 30 units of the respective samples. In this disclosure, the values of a and b of the respective corner portions are defined as values obtained by cutting each sample into two equal parts in the X-direction and polishing the cut surface so as to expose the B-B' cross section that is parallel to the Y-Z plane and by observing the cross section by a scanning electron microscope (SEM) at the magnitude of 3,000 to 30,000 times, and further by taking an average over 30 units of the sample. These values thus measured and calculated are listed in the table.

TABLE 1

| Samples | a (μm) | b (μm) | a/b | Poor Moisture Resistance Rate | Short-Circuit Defect Rate |
|---|---|---|---|---|---|
| Comparison Example 1 | 0.2 | 40 | 0.01 | 0.5% | 0% |
| Comparison Example 2 | 1 | 30 | 0.03 | 0.1% | 0% |
| Working Example 1 | 2 | 20 | 0.10 | 0.0% | 0% |
| Working Example 2 | 8 | 25 | 0.32 | 0.0% | 0% |
| Working Example 3 | 10 | 25 | 0.40 | 0.0% | 0% |
| Working Example 4 | 20 | 50 | 0.40 | 0.0% | 0% |
| Comparison Example 3 | 20 | 40 | 0.50 | 0.0% | 1% |
| Comparison Example 4 | 25 | 50 | 0.50 | 0.0% | 5% |
| Comparison Example 5 | 25 | 40 | 0.63 | 0.0% | 8% |
| Comparison Example 6 | 23 | 35 | 0.66 | 0.0% | 10% |
| Comparison Example 7 | 25 | 25 | 1.00 | 0.0% | 18% |
| Comparison Example 8 | 25 | 20 | 1.25 | 0.0% | 25% |

In the table, a is the height dimension along the Z-axis of the corner portion. That is, as shown in FIG. 10, a is a distance along the Z-axis between the first virtual line L1 extended from the first straight portion 181, and the end point P2 of the second straight portion 182 on the side of the first virtual line L1. The value of a was adjusted to take various values listed in Table 1 by adjusting the dimension z of the region S22, which is a thick portion of the elastic sheet S2.

b is the length dimension along the Y-axis of the corner portion. That is, as shown in FIG. 10, b is a distance along the Y-axis between the second virtual line L2 extended from the second straight portion 182 and end point P1 of the first straight portion 181 on the side of the second virtual line L2. The value of b was adjusted to take various values listed in Table 1 by adjusting the dimension y of the region S22, which is a thick portion of the elastic sheet S2.

As shown in Table 1, in Working Examples 1-4, the condition of a≥1 μm and 0.1≤a/b≤0.4 was satisfied.

In Comparison Example 1, a was 0.2 μm, and a/b was 0.01. Therefore, the condition of a≥1 μm and a/b≥0.1 was not satisfied.

In Comparison Example 2, a was 1 μm, but a/b was 0.03. Therefore, the condition of a/b≥0.1 was not satisfied.

In each of Comparison Examples 3-8, a/b is equal to or greater than 0.50. Therefore, the condition of a/b≤0.4 was not satisfied.

For 1000 units of each of these Working Examples 1-4 and Comparison Examples 1-8, the poor moisture resistance rate was evaluated. The poor moisture resistance rate was calculated as the proportion of units that came to have the insulation resistance of less than 1 MΩ after 100 hours of application of a voltage twice as large as the rated voltage at a temperature of 85° C. with a humidity of 85%.

The evaluated poor moisture resistance rate was 0.0% for each of the Working Examples 1-4 and Comparison Examples 3-8, which satisfied the condition of a≥1 μm and a/b≥0.1 at the corner portion. These samples therefore exhibited sufficient moisture resistance.

In Comparison Example 1, in which a was 0.2 μm and b was 0.01, the poor moisture resistance rate was 0.5%, showing inferior moisture resistance, relative to Working Examples.

In Comparison Example 2, in which a was 1.0 μm and b was 0.03, the poor moisture resistance rate was 0.1%, showing inferior moisture resistance, relative to Working Examples.

Short-circuit defect rates were additionally evaluated for each of the samples. The short-circuit defect rate was evaluated using an LCR meter with the Osc (Oscillation level) of 0.5V at a frequency of 1 kHz. For each of the samples, 100 units were randomly selected and the proportion of the units that had a short circuit among the 100 units was determined to be the short-circuit defect rate.

The evaluated short-circuit defect rate was 0% for Working Examples 1-4 and Comparison Examples 1 and 2, which satisfied a/b≤0.4. Therefore, it was found that in the Working Examples 1-4 that satisfied the above-mentioned condition, the end portions of the internal electrodes were not curved to the excessive degree so as to contact to the adjacent internal electrodes, thereby preventing short circuits.

On the other hand, in each of the Comparison Examples 3-8, in which a/b was greater than 0.4, the short-circuit defect rate was 1% or greater. In particular, the larger the value of a/b, the greater the short-circuit defect rate. Therefore, it was found that short circuits can be surely prevented by making a/b equal to or less than 0.4.

As seen above, Working Examples 1-4 where the condition of a≥1 μm and 0.1≤a/b≤0.4 was satisfied has a highly reliable configuration in which the moisture resistance is high and short circuits are prevented. Furthermore, it has also been confirmed that when the corner portion condition of a≥1 μm and 0.1≤a/b≤0.4 was satisfied, multilayer ceramic capacitors having an X-dimension of 0.2 mm and a Y-dimension and a Z-dimension both being 0.125 mm and multilayer ceramic capacitors having an X-dimension of 1.6 mm and a Y-dimension and a Z-dimension both being 0.8 mm exhibited the same superior characteristics of high reliability, high moisture resistance and sufficient short-circuit suppression.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

In the embodiments and Working Examples above, the multilayer ceramic capacitor 10 was explained as an example of multilayer ceramic electronic devices. However, the present invention is not limited thereto, and is applicable to a wide variety of multilayer ceramic electronic devices having ceramic main bodies in which internal electrodes are laminated. Such multilayer ceramic electronic devices include, for example, chip varistors, chip thermistors, multilayer inductors, etc.

What is claimed is:

1. A multilayer ceramic electronic device, comprising:
   a ceramic functional part having a generally rectangular shape in which a plurality of ceramic dielectric layers and a plurality of internal electrodes are laminated alternately in a vertical direction;
   a pair of cover parts that cover the functional part from top and bottom, respectively; and
   a pair of side margin parts covering side surfaces of the functional part, respectively,
   wherein in a plan view, an uppermost internal electrode among the plurality of internal electrodes spans an entire width of the functional part, and has an end portion reaching and terminating at one of the side surfaces of the functional par that are covered by the side margin parts, the end portion being curved downward to satisfy 2 μm≤a≤20 μm, 20 μm≤b≤50 μm and 0.1≤a/b≤0.4, where a is a dimension of the curved end portion in the vertical direction in a cross section taken along a plane perpendicular to the side surfaces, and b is a dimension of the curved end portion in a horizontal direction in said cross section, and
   wherein in the plan view, a lowermost internal electrode among the plurality of internal electrodes spans the entire width of the functional part, and has an end portion reaching and terminating at one of the side surfaces of the functional part that are covered by the side margin parts, the end portion of the lowermost internal electrode being curved upward to satisfy 2 μm ≤a' <20 μm, 20 μm≤b'≤50 μm and 0.1 ≤a'/b' <0.4, where a' is a dimension of the curved end portion of the lowermost internal electrode in the vertical direction in the cross section taken along the plane perpendicular to the side surfaces, and b' is a dimension of the curved end portion of the lowermost internal electrode in the horizontal direction in said cross section,
   wherein a top surface of each of the pair of side margin parts has a curved end portion that is curved downwardly in parallel to the vertical direction, and a bottom surface of each of the pair of side margin parts has a curved end portion that is curved upwardly in parallel to the vertical direction, the curved end portions of the uppermost internal electrode and the lowermost internal electrode respectively being less curved than the curved end portions of each of the pair of side margin parts,
   wherein the plurality of internal electrodes respectively have end portions that reach and terminate at the side surfaces of the functional part, and the end portions thereof are curved progressively greatly downwardly or upwardly towards the uppermost internal electrode and the lowermost internal electrode, respectively, and wherein the plurality of internal electrodes respectively have other end portions that reach and terminate at one of end surfaces of the functional part that are orthogonal to the side surfaces thereof, said other end portions of the plurality of internal electrodes being substantially horizontally flat, having no curved portion in the vertical direction.

2. The multilayer ceramic electronic device according to claim 1, wherein a thickness of the side margin parts is equal to or greater than 10 μm and less than or equal to 15 μm.

3. The multilayer ceramic electronic device according to claim 2, wherein the thickness of the side margin parts is equal to or less than 12 μm.

4. The multilayer ceramic electronic device according to claim 1, wherein said uppermost electrode has said curved end portion on both sides of the uppermost electrodes.

5. The multilayer ceramic electronic device according to claim 1, wherein said uppermost electrode has said curved end portion on both sides of the uppermost electrodes, and said lowermost electrode has said curved end portion on both sides of the lowermost electrodes.

6. The multilayer ceramic electronic device according to claim 1, wherein the end portion of the uppermost internal electrode is curved downward to satisfy 8 μm ≤a≤20 μm and 0.32 ≤a/b≤0.4, and the end portion of the lowermost internal electrode is curved upward to satisfy 8 μm ≤a' ≤20 μm and 0.32≤a'/b'≤0.4.

7. A method for manufacturing a plurality of multilayer ceramic electronic devices, comprising:

forming laminated sheets by laminating, alternately in a vertical direction, a plurality of first ceramic sheets, each having a plurality of internal electrode formed thereon, and a plurality of second ceramic sheets, each having a plurality of internal electrode formed thereon, and by laminating a plurality of third ceramic sheets on a top and a bottom of the laminated first and second ceramic sheets;

pressure-joining the laminated sheets in the vertical direction by sandwiching the laminated sheets by a pair of elastic sheets having a plurality of protrusions at fixed intervals from top and bottom so as to push and deform inwardly regions in the first and second ceramic sheets that do not have the internal electrodes;

cutting the pressure-joined laminated sheets into a plurality of laminated chips, the cutting including removing the said regions in the first and second ceramic sheets that have been pushed and deformed inwardly, thereby forming cut side surfaces in each of the laminated chips, each of the laminated chips thereby having a plurality of the internal electrodes superimposed in the vertical direction;

for each of the laminated chips, attaching side margin parts to said cut side surfaces; and thereafter, sintering the laminated chips with the side margin parts, wherein in each of the sintered laminated chips with the side margin parts, in a plan view, an uppermost internal electrode among the plurality of internal electrodes spans an entire width of the laminated chip, and has an end portion reaching and terminating at one of the cut side surfaces of the laminated chip that are covered by the side margin parts, the end portion being curved downward to satisfy 2 μm ≤a≤20 μm, 20 μm≤b ≤50 μm and 0.1≤a/b≤0.4, where a is a dimension of the curved end portion in the vertical direction in a cross section taken along a plane perpendicular to the cut side surfaces, and b is a dimension of the curved end portion in a horizontal direction in said cross section, wherein in each of the sintered laminated chips with the side margin parts, in a plan view, a lowermost internal electrode among the plurality of internal electrodes spans the entire width of the laminated chip, and has an end portion reaching and terminating at one of the cut side surfaces of the laminated chip that are covered by the side margin parts, the end portion being curved upward to satisfy 2 μm ≤a'≤20 μm, 20 μm≤b'≤50 μm and 0.1≤a'/b' ≤0.4, where a' is a dimension of the curved end portion of the lowermost internal electrode in the vertical direction in the cross section taken along the plane perpendicular to the cut side surfaces, and b' is a dimension of the curved end portion of the lowermost internal electrode in the horizontal direction in said cross section, wherein a top surface of each of the pair of side margin parts has a curved end portion that is curved downwardly in parallel to the vertical direction, and a bottom surface of each of the pair of side margin parts has a curved end portion that is curved upwardly in parallel to the vertical direction, the curved end portions of the uppermost internal electrode and the lowermost internal electrode respectively being less curved than the curved end portions of each of the pair of side margin parts, wherein the plurality of internal electrodes respectively have end portions that reach and terminate at the side surfaces of the functional part, and the end portions thereof are curved progressively greatly downwardly or upwardly towards the uppermost internal electrode and the lowermost internal electrode, respectively, and wherein the plurality of internal electrodes respectively have other end portions that reach and terminate at one of end surfaces of the functional part that are orthogonal to the side surfaces thereof, said other end portions of the plurality of internal electrodes being substantially horizontally flat, having no curved portion in the vertical direction.

8. The method for manufacturing the plurality of multilayer ceramic electronic devices according to claim 7, wherein the end portion of the uppermost internal electrode is curved downward to satisfy 8 μm ≤a ≤20 μm and 0.32 ≤a/b ≤0.4, and the end portion of the lowermost internal electrode is curved upward to satisfy 8 μm ≤a'≤20 μm and 0.32≤a'/b'≤0.4.

* * * * *